No. 673,093. Patented Apr. 30, 1901.
R. P. STEVENS & A. L. WARE.
COUNTER MACHINE.
(Application filed Jan. 31, 1901.)
(No Model.) 8 Sheets—Sheet 1.

Fig. 1.

Witnesses:

Inventors:
Albert L. Ware & Ralph P. Stevens,
by their atty,
Henry J. Miller

No. 673,093. Patented Apr. 30, 1901.
R. P. STEVENS & A. L. WARE.
COUNTER MACHINE.
(Application filed Jan. 31, 1901.)
(No Model.) 8 Sheets—Sheet 2.

No. 673,093. Patented Apr. 30, 1901.
R. P. STEVENS & A. L. WARE.
COUNTER MACHINE.
(Application filed Jan. 31, 1901.)
(No Model.) 8 Sheets—Sheet 3.

Witnesses:
Inventors:
Albert L. Ware & Ralph P. Stevens,
by their atty. Henry J. Miller No. 673,093.  
Patented Apr. 30, 1901.

R. P. STEVENS & A. L. WARE.

COUNTER MACHINE.

(Application filed Jan. 31, 1901.)

(No Model.)

Witnesses:
A. G. Rose
Wm. H. Varnum

Inventors:
Albert L. Ware & Ralph P. Stevens,
by their atty. Henry J. Miller

No. 673,093. Patented Apr. 30, 1901.
R. P. STEVENS & A. L. WARE.
COUNTER MACHINE.
(Application filed Jan. 31, 1901.)

(No Model.) 8 Sheets—Sheet 5.

Witnesses:
A. G. Rice
Wm. H. Varnum

Inventors:
Albert L. Ware & Ralph P. Stevens.
by their atty. Henry J. Miller No. 673,093. Patented Apr. 30, 1901.
R. P. STEVENS & A. L. WARE.
COUNTER MACHINE.
(Application filed Jan. 31, 1901.)
(No Model.) 8 Sheets—Sheet 6.

Witnesses:
A. G. Rice
Wm. H. Varnum

Inventors:
Albert L. Ware & Ralph P. Stevens,
by their atty, Henry J. Miller

No. 673,093. Patented Apr. 30, 1901.
R. P. STEVENS & A. L. WARE.
COUNTER MACHINE.
(Application filed Jan. 31, 1901.)

(No Model.) 8 Sheets—Sheet 8.

Witnesses:
A. G. Rice
Wm. H. Varnum

Fig. 24.

Inventors:
Albert L. Ware, Ralph P. Stevens,
by their atty, Henry J. Miller

UNITED STATES PATENT OFFICE.

RALPH P. STEVENS, OF CAMBRIDGE, AND ALBERT L. WARE, OF ARLINGTON, MASSACHUSETTS, ASSIGNORS TO CHARLES F. WORCESTER, TRUSTEE.

COUNTER-MACHINE.

SPECIFICATION forming part of Letters Patent No. 673,093, dated April 30, 1901.

Application filed January 31, 1901. Serial No. 45,465. (No model.)

*To all whom it may concern:*

Be it known that we, RALPH P. STEVENS, residing at Cambridge, and ALBERT L. WARE, residing at Arlington, in the county of Middlesex and State of Massachusetts, have invented certain new and useful Improvements in Counter-Machines, of which the following is a specification, reference being had therein to the accompanying drawings.

This invention relates to machines for manufacturing boot and shoe counters or heel-stiffeners.

One object of the invention is to provide a machine whereby suitable stock may be shaped in outline, skived, crimped, and curved and molded into finished counters as a progressive operation.

Another object of the invention is to combine in an organized machine a dying-out mechanism, a work-holder and feeder, skiving means, crimping devices, and a plurality of molding-machines with their related connections and feeding devices.

Another object of the invention is to so construct a vacuum work-holder that as material is fed thereto portions of its surface may be successively engaged and held.

Another object of the invention is to so combine a dying-out machine and a vacuum work-holder that the blank may be presented progressively against the holder by the die.

Another object of the invention is to so construct a vacuum work-holder having a curved surface that the material may be fed thereto tangentially and held without material loss of vacuum.

Another object of the invention is to improve the general construction of vacuum work-holders.

Another object of the invention is to improve the construction of the skiving means and to positively control the same.

Another object of the invention is to so combine a skiving-machine and its work holder and feeder with a crimping-machine that as the work is progressively released from the work-holder it is fed to the crimper.

Another object of the invention is to combine a crimper with a plurality of molders, the capacity of the crimper in its action on the material being equal to the molding capacity of all the molders.

Another object of the invention is to provide a plurality of counter-molding machines with means for alternately feeding the blanks thereto.

Another object of the invention is to rapidly release the finished counters from the molders.

Further objects of the invention will appear as the description of the machine is set forth.

The invention consists in the combination, in an organized machine, of dying-out means, skiving means, crimping mechanism, and a molder with connections therebetween whereby the separate mechanisms are combined in progressive coöperation.

The invention also consists in the segregable features of novel construction which may be adapted for independent operation.

The invention also consists in such features of construction and combination of parts whereby the various objects of the invention may be carried into effect, as shall hereinafter be more fully described, and pointed out in the claims.

Fig. 10 represents an enlarged view of the skiving devices and their carriages with a portion of the work-holder cylinder carrying a blank under the action of the skivers, also showing the construction of the valves for the vacuum-holders and the means for positively controlling the swinging and traversing skiver. Fig.

11 represents a view, taken at right angles to Fig. 10, of the hanger for the swinging and traversing skiver, Fig. 12 representing an enlarged plan view of portions of the work-holder cylinder, showing one of the work-holders and the controlling-cams for the swinging skiver. Fig. 13 represents a vertical section of the work-holder cylinder in relation to the crimper, the feed-passage to and from the crimper, the receiver for receiving the crimped and partially-curved counter-blank, and the alternately-acting feeding device for the counter-blank molders. Fig. 14 represents an elevation of the receiver and the molder-feed device, showing the means for actuating the same. Fig. 15 shows details of the kicker-off device for removing the finished counters from the form of the molder, Fig. 16 showing a detail of the connection between the pantograph feed-actuator and the cam-lever for the same. Fig. 17 represents a longitudinal sectional view of one of the molders with a counter-blank in position, Fig. 18 representing an elevation of one of the molders removed from the machine, showing a counter on the form with its lip-ironer down.

Similar characters of reference designate corresponding parts in all the figures.

In carrying this invention into practice our main object has been to provide an organized machine whereby blanks of suitable material fed to the machine should be operated upon by progressively-coöperating mechanism to die out the blanks, to skive the edges of the blank, to crimp and partially curve the same, to finally mold the counter, and to deliver this finished product.

No less important than the main object of the invention are those novel segregable features of construction and combination of parts by the progressive coöperation of which the attainment of the main object is effected in a most perfect manner.

In the drawings, 25 25 represent the main side frames of the machine, which are of strong construction and are suitably braced together. Journaled in bearings in the side frames is the drive-shaft 26, furnished with the pulleys 27 and 28 and with the gear 29, this gear 29 meshing with the gear 30, journaled on the shaft 31, which is fixed in the frame, the gear 32 on the journaled shaft 33 being engaged and driven by the gear 30.

The respective ends of the machine will hereinafter be designated as "front" and "rear," the front or forward end being that at which the initial operation of dying out the blank is performed and the rear end being that at which the drive-shaft 26 is mounted.

Near the lower front portion of the machine-frame is rotatably mounted the die and die-feed-operating shaft 34, having the gear 35, which meshes with the gear 30 and is driven thereby. On the shaft 34 are fixed the vertically-eccentric cam 36 and the laterally-acting cam 37, and mounted on the fixed shaft 31 and on the stay 38 are the blocks 39 and 40, provided with the guides 41 and 42 and connected by the top plate 43 and the female die 44, the block 39 being furnished with guides 45, in which a series of holding-rolls 46 are mounted to move upward under the action of springs to a limited extent.

Figure 6:
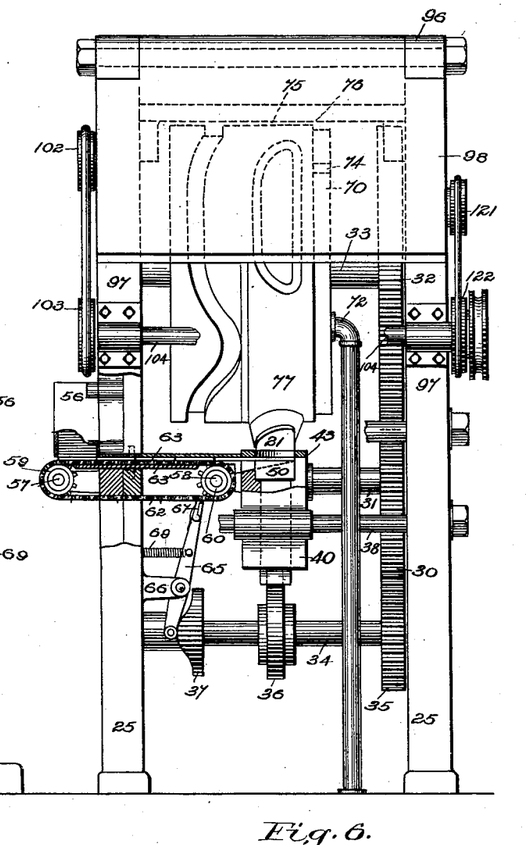
Fig. 6 represents a forward end view of the machine, Fig. 7 being a detail view of portions of the feeder-chain.
Figure 7:
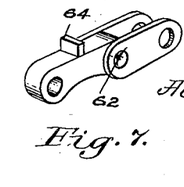
Figure 8:
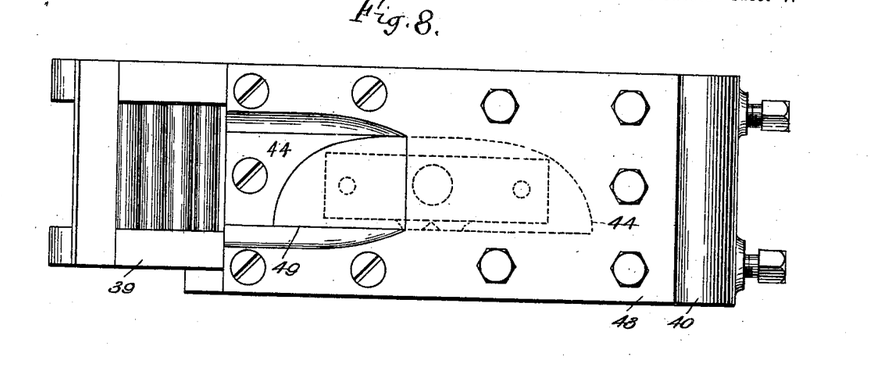
Fig. 8 is an enlarged plan view of the die and the holding-rolls.
Figure 9:
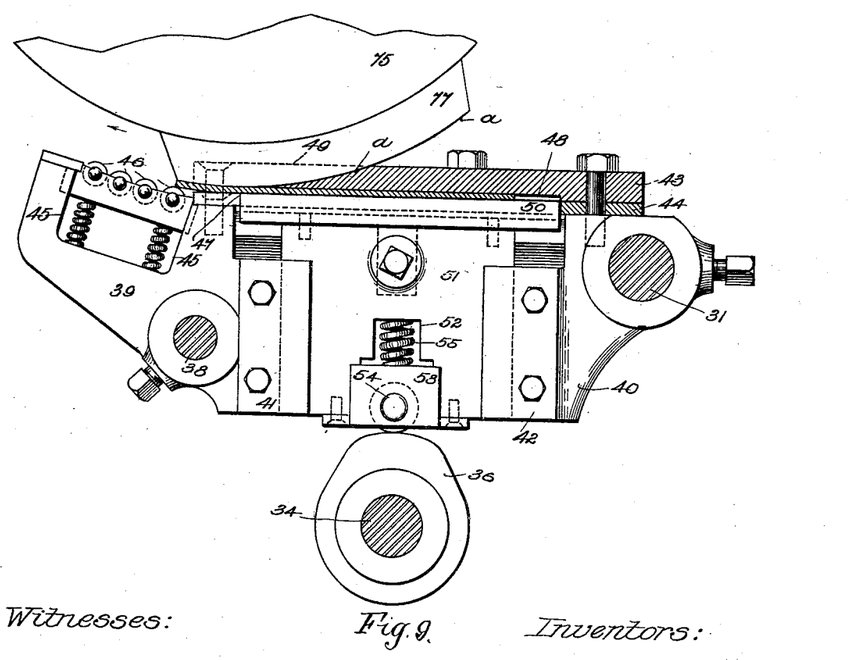
Fig. 9 is an elevation, partially in section, showing the work-holder in relation to the die and the died-out blank.
Figure 20:
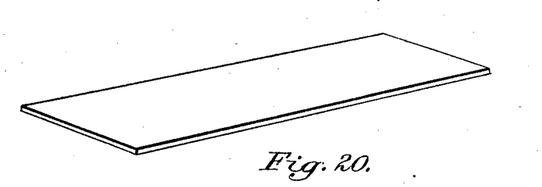
Figure 21:
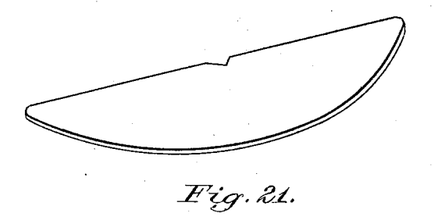
Fig. 21 is a view of the died-out blank as it is fed to the work-holder from the dying-out machine.
Figure 22:
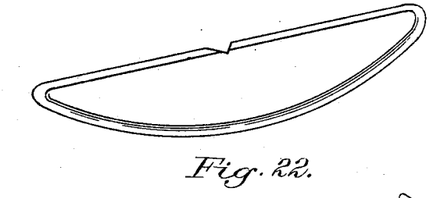
Fig. 22 is a similar view of the skived counter-blank.

The construction of the dying-out mechanism will be more readily understood by reference to Figs. 8 and 9 of the drawings, its association with the blank-feeder being shown in Fig. 6. The female die 44 consists of a piece of hardened metal having a thickness slightly in excess of the thickness of the blank to be cut and having a central opening the outline of which corresponds to the outline of the proposed died-out counter-blank, Fig. 21. This female die, as has been stated, is secured on the tops of the blocks 39 and 40, and the opening 47 extends nearly the distance between these blocks. Above the female die 44 is secured also to said blocks the receiving-plate 43, having in its under surface a recess 48, shaped to receive the died-out counter-blank in a position to accurately deliver the same. At its delivery end the material of this plate 43 is cut away to a curved surface extending into this end of the recess 48 to form the open delivery-channel 49, through which the curved receiving-surface of the work-holder may move into contact with this end of the counter-blank. On the feeding side of the die-frame space is provided between the female die 44 and the guides 41 and 42 to allow the blank to be fed thereinto between the female die 44 and the movable male die 50. This male die 50 is mounted on the base 51, which is free to be moved vertically in the guides 41 and 42, the base having the opening 52, in which the block 53 has a limited movement, the block being furnished with the roller-bearing 54 and the spring 55 being interposed between the upper surface of the block and the lower surface of the opening 52. The roller 54 bears against the periphery of the cam 36. To one of the side frames 25 is secured the bottomless hopper 56, into which the blanks, Fig. 20, are placed. Below this hopper in suitable brackets are journaled the shafts 57 and 58, on each of which is fixed a pair of sprockets 59 and 60, and on these pairs of sprockets work the feed-chains 61 and 62, which pass between the partitions 63 in their course and have studs, as 64, set at predetermined distances to engage the outer edges of the lowermost blank in the hopper 56, and to thus carry the blank along as the chains 61 and 62 are propelled. The propelling mechanism for the feed-chains comprises the lever 65, pivoted to the arm 66, extending from the side frame and having at its upper end the pivoted pawl 67 and the pawl-spring 68. At its lower end this lever bears against the face of the cam 37 to move the upper end of the lever toward the dying-out mechanism, and the spring 69, secured to the frame and to the lever, is provided for exerting a return pressure on the upper end of the lever and keeping the lower end in contact with the cam. In Figs. 6, 8, and 9 of the drawings the parts thus described are shown in the positions they will assume immediately after the dying or shaping, but before recovery. As the shaft 34 continues to rotate from this position the block 51 and its male die 50 will move downward, leaving a space between the female die 44 and the male die 50. The lever 65 under the action of the retracting-spring 69 will engage with its pawl 67 one of the links of the chain 62 and propel the same until the foremost blank on the upper reach of the chain is fed in between the female die 44 and the male die 50 and is there held by the pressure of the spring 69 and the lever 65 until the male die 50 has by its operating mechanism been brought against the blank. During the dying operation the cam 37 works against the lower end of the lever to swing the upper end toward the die and to elongate the spring 69, the spring-pawl 67 yielding in such movement, so that the chain is not moved backward. It is evident that any usual form of one-direction engaging mechanism, such as a pawl and ratchet, may be employed to positively prevent rearward movement of the chain, if found desirable.

Attention is called to the fact that at each downward movement of the male die 50 the refuse material cut from the counter may drop out from the inclined portions above the guides 41 and 42.

Figure 1:
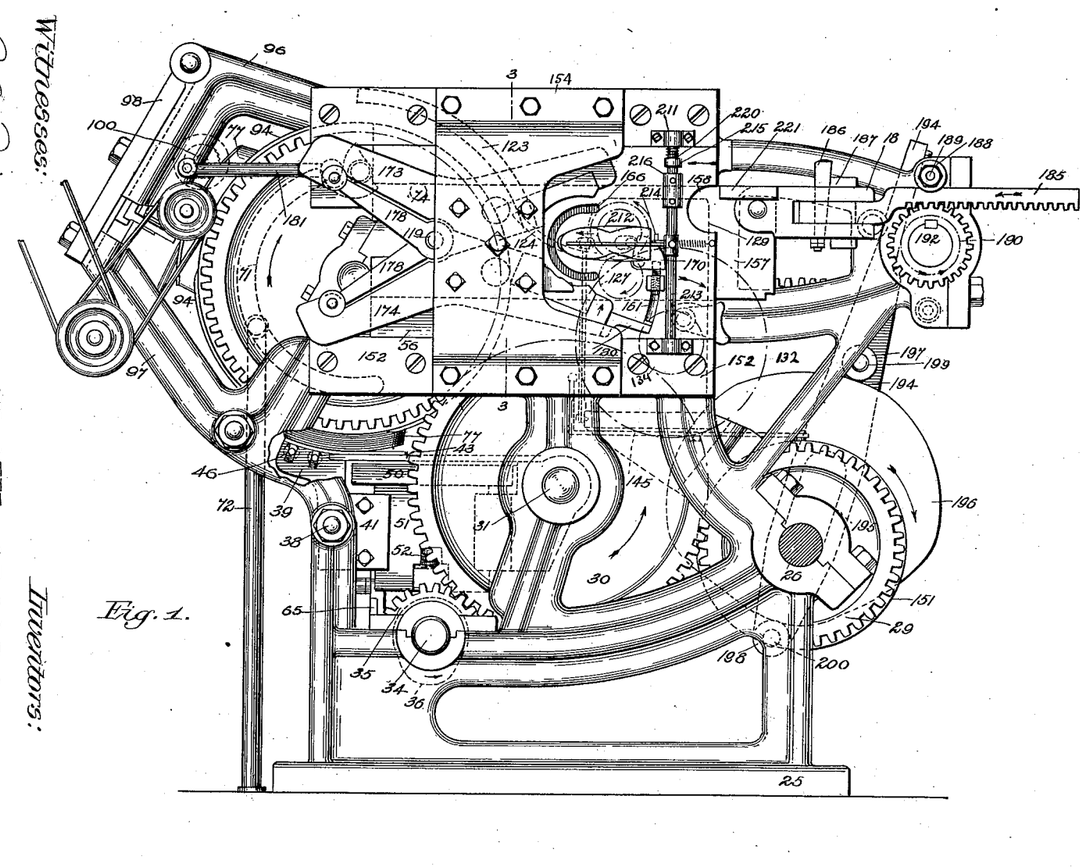
Figure 1 represents a side elevation of the counter-making machine.

On the shaft 33 is supported, but free from rotation, the disk 70, having the curved channel 71 on its inner surface, which is connected with the pipe 72, leading to any suitable exhaust apparatus, whereby the air may be exhausted from said channel. In this inner surface of the plate 70 are also formed small annular channels 73, adapted to receive fluid packing, while at the upper portion of the disk, beyond this end of the curved channel 71, is a transverse perforation 74, located on the same radius as is the extension of the channel, this perforation being shown in dotted lines in Figs. 1 and 6.

Figures 10, 11, 12:
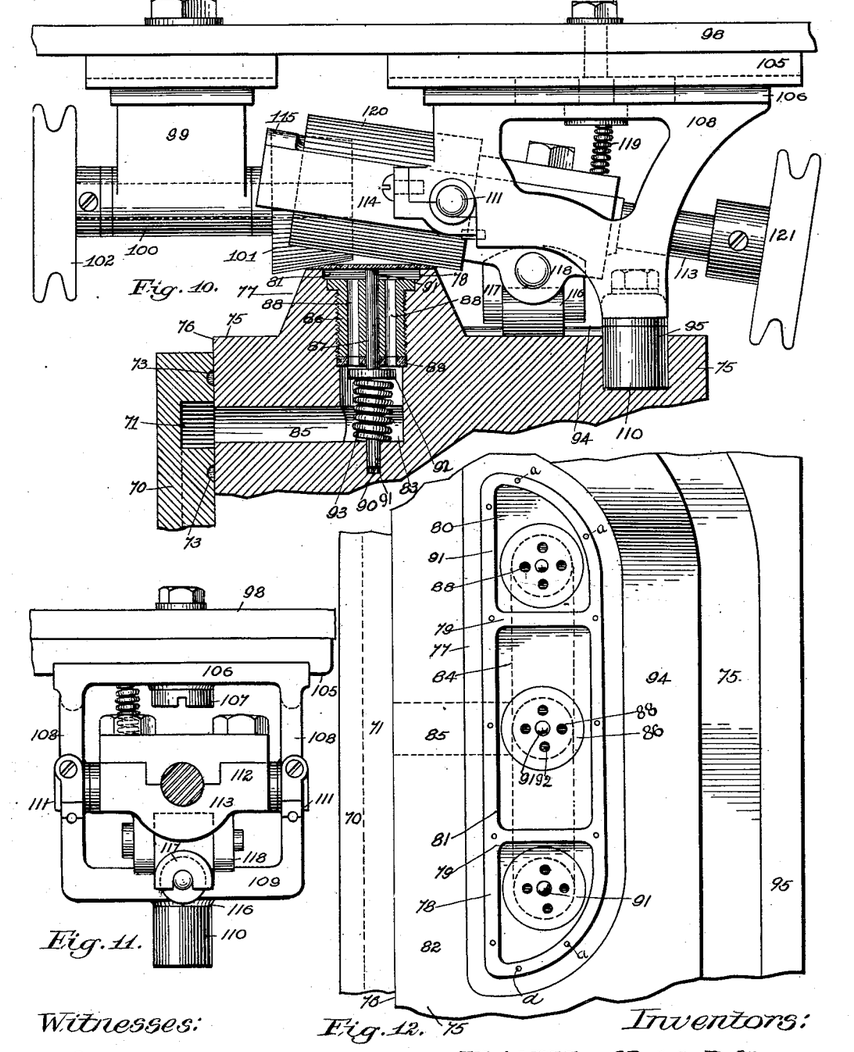

Fixed on the shaft 33, and consequently rotating therewith, is the work-holding cylinder 75. Alternative for such title it may be termed the "skiver-feed," it being herein shown and described as a cylinder merely to illustrate a form operative with the particular associated parts. This cylinder has a vertical plain surface 76, which closely fits against the inner surface of the disk 70, so that by the use of the fluid packing in the channels 73 73 an annular air-tight path is provided between the disk and the cylinder, which includes the channel 71 and the perforation 74. The periphery of the work-holding cylinder is furnished with a series of raised portions 77 77, herein called "work-holders," the number depending upon the desired capacity of the machine. Each of the work-holders is shaped in outline to the approximate outline of the article to be held thereby, herein to the shape of the blanks 21, and the peripheral surface of each holder comprises the border 78, forming an outline-wall and connected at intervals by cross-partitions, as 79 79, having top surfaces extending in the same general plane as the surface of the border 78. Between the border and these partitions the surfaces are depressed, as shown in 80, 81, and 82, Fig. 12, and at 81 on Fig. 10 of the drawings. It is obvious that additional compartments may be formed to further subdivide the area of the work-holder.

In each of the compartments of each work-holder is formed one or more chambers, as 83, each group of chambers being connected by the passage 84, from which the outlet 85 extends to the surface 76 of the cylinder on a radius comparative to that of the channel 71 in the disk 70. Into each of these chambers 83 is screwed a plug 86, having a central bore 87 and a series of air-passages 88 88, the correspondingly-perforated valve-seat 89 being secured against the lower end of said plug.

Reciprocal in the bore 87 and in the socket, as 90, in alinement therewith is the valve-stem 91, having the valve 92, against which a closing pressure is exerted by the coiled spring 93. When the valve bears against the packing 89, the outer end of the valve-stem extends slightly beyond the general surface plane of the walls 78.

On the periphery of the cylinder 75 is a series of cams 94 94, which extend from a point approximately opposite the partition 79 of one work-holder to a point opposite the nearest corresponding portion of the next work-holder, the ends of the cams merging into the surface of the cylinder. In the surface of the cylinder 75 is also formed the cam-groove 95, which curves outward opposite the curved ends of the work-holders and then extend parallel to the straight portion of the wall 78 thereof.

The skiving mechanism is operatively mounted on the supplemental frame formed by the members 96 and 97, extending from the main side frames. To these members is secured the plate 98, to which at the side of the machine corresponding to the straight walls of the work-holders is adjustably secured the bracket 99, in which is journaled the shaft 100, carring at its inner end the bevel milling-cutter 101 and at its outer end a band-pulley 100, which is connected by a belt with the pulley 103 on the shaft 104, journaled in bearings on the members 97 and driven in any ordinary manner. Depending from the plate 98 is the lateral guide 105, in which the frame-plate 106 is free to reciprocate, being secured by the bolt 107, extending through a slot in the plate 106. From this top plate extend the sides 108 108, connected at their lower ends by the cross-bar 109, having a bearing on which the sleeve 110 is free to rotate, this sleeve fitting into the cam-groove 95 of the cylinder 75. At the inner ends the side plates 108 are furnished with bearings in which are journaled the trunnions 111 111 of the milling-frame 112. This frame is designed to form a bearing for the milling-shaft 113, journaled therein, and has the side plates 114, connecting the main portion of the frame 112 with the end 115. The milling-shaft 113, being journaled in this frame 112, follows any change in the swinging of that frame on its trunnions, this being controlled by the roller-bearing 116, journaled in a frame 117 between the brackets 118 118 from the frame 112 and bearing on the cams 94 of the cylinder 75 as the surface of the cylinder moves by the same, pressure being exerted by the spring 119 to hold the roller-bearing 116 against the cams, as 94, or against the surface of the cylinder between said cams. The shaft 113 has at its inner end the straight-face milling-cutter 120 and at its outer end the pulley 121, belted to the pulley 122 on the shaft 104 and driven therefrom.

Returning now to the description of the dying-out mechanism and to illustrate its cooperative relation to the work-holding cylinder 75 it will be seen that, slightly prior to the time at which the parts have assumed the positions shown in Fig. 9, the died-out counter-blank 21, having been forced through the female die, is supported in the recess 48 of the plate 43, the straight edge of the counter-blank against the straight edge of the depression to maintain the blank in exact alinement with the approaching work-holder, the forward end of the blank extending into the open channel of the plate 43 on a line with this end of the male die. At the time the blank is thus died out the forward end of one of the work-holders 77 is entering the channel 49 of the plate 43, the rotation of the cylinder 75 being timed accordingly, and as the counter-blank is raised into the recess 48 by the male die 50 the forward end of the counter-blank is pressed against the corresponding end of the holder, the edge of the counter-blank being accurately placed on the forward end portion of the wall 78, where this portion of the counter-blank may be engaged with pins $a$ $a$, if desired. The radius of the curved surface of the work-holder is such that, approximately at the time this curved surface meets the tangential plane of the top of the counter-blank, the pressure of the male die 50 will actuate the valve-stem 91 of the compartment 80 of the work-holder to force the valve 92 away from its seat 89 and opening the passages 88, through which a suction will be created to the vacuum-channel 85 of the cylinder and that 71 of the disk 70, the channel 85 having been brought opposite the lower end of the channel 71 slightly prior to this time. The valve-stems of the different compartments being thus successively operated by the sustaining of the counter-blank by the male die 50 and its spring-support 55 and by the holding-rolls 46, the area of the counter-blank will be progressively brought under the action of the vacuum without material loss of vacuum, as would occur if the inlet-ports were permanently open or if they were opened before the counter-blank or other work was positioned to form a barrier to the inrush of air. The holding-rolls 46 serve to further press and smooth the counter-blank against the surface of the wall 78 and the partitions 79 to effectually close all leaks. It is of course understood that the surface of the work-holder may be divided into as many depressed compartments as is desired, this number depending somewhat on the thickness of the leather-board or other material of which the counter-blanks are formed, as also upon the condition of such material or of the practical pressure of the suction created by the vacuum. When the counter-blank has thus been firmly fixed on the work-holder without stopping the cylinder, it is carried around through the skiving mechanism to bevel its edges. At the time the work-holder is passing the dying-out means the bearing 116 of the swinging milling-skiver 120 has begun to ride up onto the forward end of the associated cam 94 to control the skiver 120 on the finishing of the skiving of the counter-blank preceding that now under consideration. As the bearing 116 rides outward from the surface of the cylinder 75 on the inclined end surfaces of the cams 94 that portion of the milling-frame 112 above said bearing will be moved until the main surface of the cam is reached by this bearing, when the face of the milling-cutter will be but slightly inclined to the transverse-surface plane of the approaching counter-blank. In this position of the milling-cutter the forward end of the counter-blank will be presented to the milling action thereof, and as at this point the bearing 116 begins to approach the surface of the cylinder the spring 119 is allowed to act to depress its end of the milling-frame, and thus elevate the cutter end thereof to increase the inclination of the milling-cutter with respect to the surface of the counter-blank until the bearing 116 works on the surface of the cylinder 75, at which time said inclination of the milling-cutter will be greatest. At the time the first action of the milling-cutter 120 on the forward end of the counter-blank is made the bearing-sleeve 110, working in the cam-groove 95, causes the traverse of the milling-frame plate 106 in its guide 105 and of the cutter and other mechanism carried thereby to accommodate the cutter to the curved edge of the counter-blank until the straight portion of the blank edge is reached. There will then be a dwell in the operation of these cutter-controlling devices until the rear curved end of the counter-blank is reached, when these steps are reversed and the cutter remains in position to take the first cut on the next blank presented. The bevel milling-cutter 101 being positioned an operative distance beyond the cutter 120 acts against the straight edge of the counter-blank at that side and bevels the same at the inclination for which it is designed.

Figure 23:
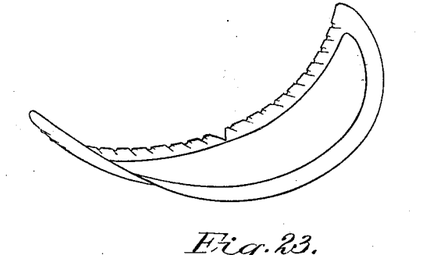
Fig. 23 is a view of the crimped and curved counter-blank, Fig. 24 being a view of the finished molded counter as it is delivered from the machine.
Figure 24:
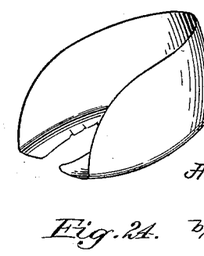

Above the rear portion of the cylinder 75, at a distance therefrom to admit of the free passage thereunder of the work-holders and the blanks thereon, is secured the curved guard-plate 123, at the lower end of which is located the entrance of the curved crimper-feed conduit 124, which leads the counter-blank through an opening in the lateral curved receiver 125 and ends between the crimper-rolls 126 and 127. It will be understood that this conduit 124 ends at the convex wall of the receiver 125 and begins again at the concave wall thereof, so that this receiver may not be obstructed. From the opposite side of the crimper-rolls the curved channel 128 leads to an opening in the receiver 125, directly above the point at which the receiver is intersected by the conduit 124, and this channel may also be furnished with a mechanical feed device. The crimper-rolls 126 and 127, with their operating mechanism, are of the well-known construction usually found in counter-crimping machines. The rolls are journaled in bearings in the crimper-frame 129 and are driven by gears 130 and 131, the gear 131 being driven by the gear 132 on the journaled shaft 133, which has the gear 134, meshing with the gear 30. By reference to the drawings it will now be seen that the vacuum will be exerted to hold the crimper-blank onto the work-holder until the center of the holder (the passage 85) passes the upper end of the curved channel 71 in the disk 70. At this time the forward end of the counter-blank has entered beneath the guard-plate 123 and is still held against its seat by the pressure of the atmosphere and by pins $a\ a$. When the forward end of the counter-blank reaches the open end of the conduit 124, the passage 85 has been brought opposite the opening 74, which, being open to the atmosphere, opens the passage to the admission of air to break the vacuum in the holder, the skived counter-blank 22 thus being released from the holder and being fed through the conduit 124 to the bite of the crimping-rolls 126 and 127. This feeding of the counter-blank 22 through the conduit may be facilitated, if found desirable, by the use of one or more feed-rolls, as 135, working through an opening or openings in the conduit and driven in any usual manner or by any other well-known feeding mechanism. The skived counter-blank 22 being thus fed to the bite of the rolls 126 and 127 is curved in its passage therethrough and is crimped along its straight edge, as is illustrated in Fig. 23 of the drawings, and it now passes through the passage 128 to and into the lateral curved receiver 125, closing the opening of the conduit 124. Obviously the crimped counter-blank 23 thus deposited in the receiver 125 must be removed before a succeeding skived counter-blank 22 can pass to the crimping-rolls.

On the crimping-frame 129, secured in the machine, is pivoted the lower member 136 of the pantograph-frame, having cross members 137 138 and the lever-arm 139. Axially disposed with relation to the receiver 125 is the rod 140, secured in the side frames 25 25, and on this rod is reciprocal the tube 141, to which the arm 139 is pivoted and having radial arms, as 142, which work through longitudinal slots in the inner side of the receiver 125 and carry followers 143 and 144, which fit the interior of the receiver.

To the lower portion of the crimper-frame 129 is pivoted the laterally-swinging arm 145, having the upturned end 146, in the upper end of which is a bearing for the perforated ball 147, which is free to move along the pin 148 of the pantograph member 137 to accommodate itself in position on this pin to the swing of the end 146, and on the end of the arm 145 is the bearing 149, which works in the cam-groove 150 of the cam 151, fixed on the main drive-shaft 26.

As the dying out, skiving, and crimping are accomplished in much less time than the molding of the counters, duplex molding-machines are provided, to which the crimped counter-blanks 23 are alternately fed from the receiver 125.

Figure 3:
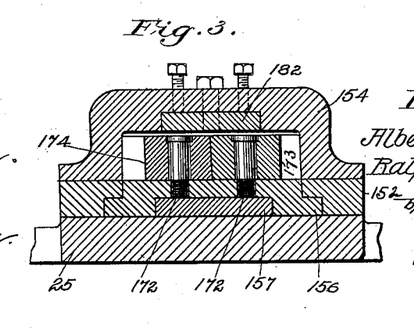
Fig. 3 represents a vertical cross-sectional view of the molder-jaw arms, their slides, and the frame on a line 3 3, Fig. 1.
Figure 4:
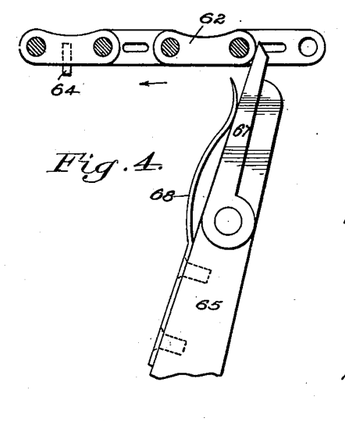
Fig. 4 represents enlarged details of the feed-chain and its operating-arm.
Figure 5:
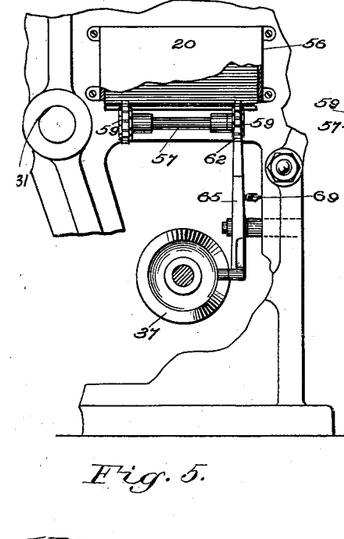
Fig. 5 represents a forward side view of portions of the machine, showing this feeding device.
Figures 13, 14, 15, 16, 17:
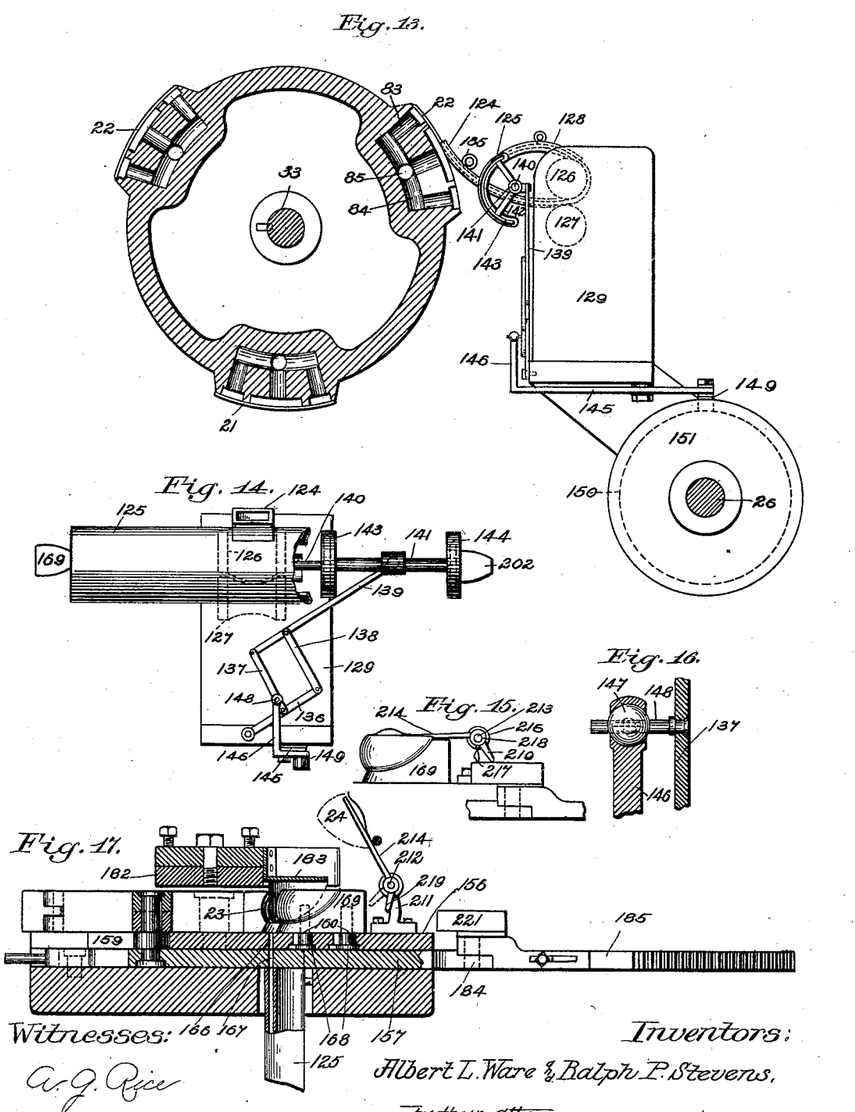
Figure 18:
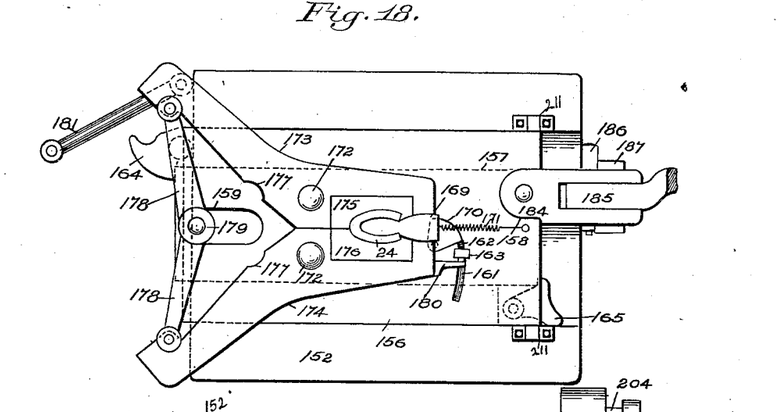
Figure 19:
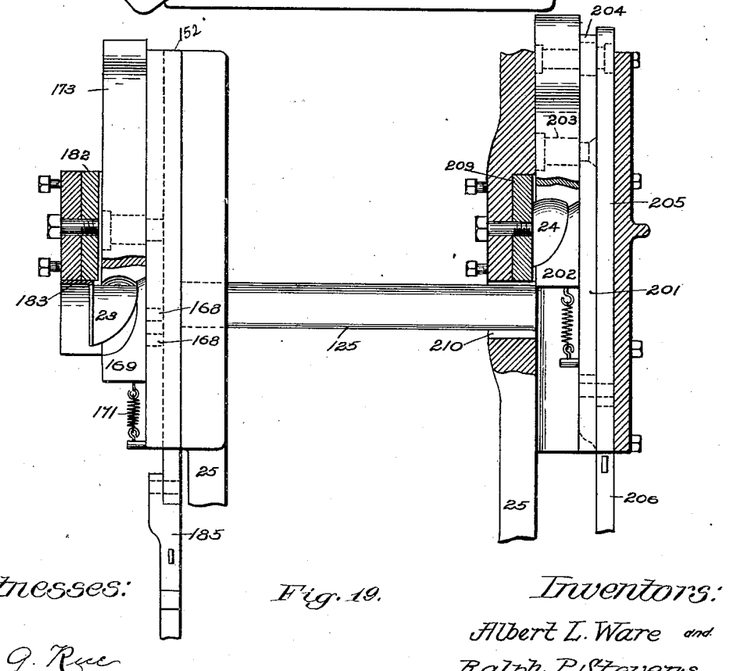
Fig. 19 represents a plan view of the molders removed from the machine partially in section, Fig. 20 being a view of one of the blanks as they are supplied in quantities to the hopper.

To the upper outside portions of the main side frames are secured the molder frame-plates 152 and 153, which are furnished with the respective yokes 154 and 155, which for some slight differences in construction will be separately described. The plate 152 (shown with its more closely-associated parts in section in Fig. 3) is shaped to form a guide for the primary slide 156, which has a recess in its face next the frame 25 to form a way in which the secondary slide 157 is free to reciprocate, the primary slide having the rear cut-out portion 158, (shown in Figs. 1 and 18,) the slot 159, and the guide-slots 160 160, Fig. 17. In its surface is the curved groove 161, in which the spring 162 is loosely held by the guard 163. At its front end, corresponding to the initial end of the machine, is the pivoted lifter 164, and at the rear end in a suitable recess is pivoted the latch 165, shaped as is illustrated in Fig. 18. Through both of the slides 156 and 157 are formed lateral slots 166 and 167, which correspond in their curvature, size, and relative location to that of the curved receiver 125, so that these slots may at suitable times be brought into registration with the end of the receiver 125 where it extends through the machine-frame.

In the slots 160 160 of the primary slide 156 work the pins 168 168, to which the form 169 is secured, this form being of the usual heel shape in the particular machine now under consideration. Adjacent to the rear end of the form is pivoted to the slide 156 the segmental pusher 170, its forward edge bearing against the rear end of the form and held in position by the coiled spring 162. To a pin on the slide 156 is fastened one end of the retracting-spring 171, the other end of which is secured to the form.

Secured in the primary slide 156 are the pivots 172 172, of substantial construction, and on these pivots the molder-levers 173 and 174 are mounted to swing. These levers have jaws 175 and 176, complemental in shape to the shape of the form. The levers have on the backs of their inclined members the cut-out portions 177 177, and said members are connected by the toggle-links 178 178, pivoted to such members and to the stud 179, which works through the slot 159 in the primary slide and is secured in the secondary slide 157. On the molder-lever jaw 174 is the finger 180, which when the jaws are closed together presses upward the spring 162, causing the same to act on the segmental pusher 170 to push the form inward against the tension of its spring 171.

Bearing against the forward end of the primary slide 156 is the strut 181, which is pivotally mounted on the depending portion of the frame member 96 and at the initial part of the movement of the secondary slide prevents the inopportune movement of the primary slide.

In a recess at the inner side of the yoke 154 is secured the ironer-plate 182; but slightly removed from the outer surface of the molder-levers and also secured to this yoke is the guard-plate 183, extending immediately over the opening 166 in the primary slide.

To the rear end of the secondary slide 157 is secured the fitting 184, between the arms of which the rack 185 is secured by the key-wedges 186 and 187, seated in slots in these arms and in the portion of the rack therebetween, the rack extending rearwardly and bearing with its upper plain surface against the sleeve 188, journaled on a stud 189, secured in the main frame, thus preventing the lifting of the rack from its engagement with the teeth of the gear 190.

The rack-driving gears 190 and 191 are fixed on the shaft 192, journaled in the rear end of the main frame and having the gear 193 also fixed thereon, with which the rack-arm 194 engages. This arm has a slot 195, working over the main drive-shaft 26, and is caused to reciprocate in a vertical slightly-inclined direction by the cam 196, fixed on the main drive-shaft, against the periphery of which ride the sleeve-bearings 197 and 198, mounted on the pins 199 and 200 of said arm.

Figure 2:
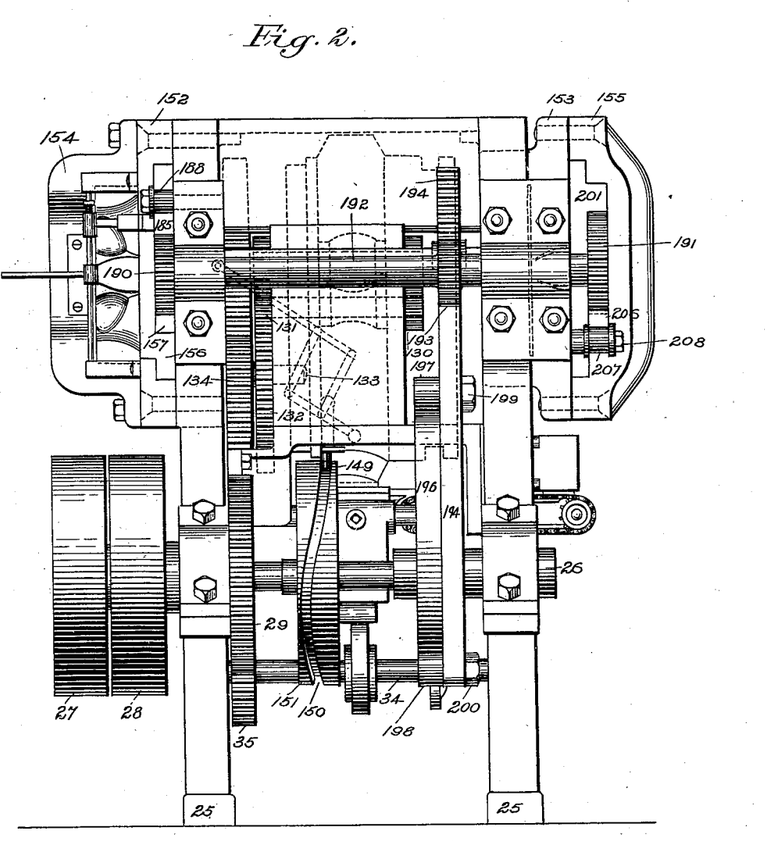
Fig. 2 represents a rear end elevation of the same.

The mechanism of the molder means at the right-hand side of the machine, Fig. 2, is similar in construction to that above described; but the location of some of its parts is reversed to bring the same into position to act correctly on the crimped counter-blank. In this latter structure the yoke 155 has guides in which the primary slide 201 works, the details of the construction of this slide and of its coöperating mechanism being similar to those of the slide 156, leaving the form 202 mounted and operated as above described, the pivoted molder-levers, as 203, with their pivoted toggle-links connected on the stud 204, which works through a slot in said slide similar to the slot 159 and is secured in the secondary slide 205. This slide 205 works in the guides of the primary slide and is furnished with a rack 206, which is supported on the sleeve 207, journaled on the pin 208, extending from the main frame and engaging with the gear 191. The ironer-plate 209 is secured in a recess on the outer side of the main frame 25 and sustains the same relation to the form 202 and the molder-jaws as does the plate 182 to its related parts of that nature.

Any suitable means may be employed for removing the molded counter from the form 202 as it returns to position opposite the opening 210 in the main frame and passing the counter through said opening to a suitable conduit.

As above stated, as each crimped counter-blank 23 passes into the curved receiver and lateral feed-chamber 125 it closes the openings of the conduit 124 and must be moved therefrom before another skived counter-blank can pass through this chamber on its course to the crimper. The oscillation of the pantograph-lever 139 is so timed that as a crimped counter-blank enters the chamber 125 in the positions shown in Fig. 14 this lever will slide the tube or hub 141 and its followers 143 and 144 to the left, the follower 143 pushing the crimped counter-blank along the chamber and out of the same through the curved slots 166 and 167, which are regulated to register with the open end of the chamber at this time until the counter-blank brings up against the guard-plate 183, Fig. 17, between the last 169 and the jaws 175 and 176. Immediately thereafter the cam 151 causes the actuation of the pantograph to withdraw the follower 143, with its attached mechanism, to a point within the receiver 125, when a slight dwell is made until the end of the form 202 of the alternate molder mechanism has been brought opposite the opening 210 of its side frame and the molded counter thereon has been discharged. The hub 141 and its followers are then moved to the right, engaging the crimped counter-blank, which has during this time been deposited in the receiver 125, and carrying the blank to the form 202. The counter-molders are alternative in their action, as the left-hand molder is operated to mold the crimped counter-blank and turn down its crimped edge and the other molder is operated to release and discharge the finished counter. When the crimped counter-blank is placed between the form 169 and its complemental jaws, the cam 196 begins to act on the bearings of the lever 194, moving the same upward and causing the rotation of the shaft 192 by the engagement of the teeth of this lever with the gear 193. As the shaft 192 rotates the gear 190 causes the forward reciprocation of the rack 185 and its slide 157 until the rounded end of the fitting 184 enters the rounded step 158 in the slide 156. At the same time the stud 179 will be moved, with its attached slide, to exert a spreading action on the toggle-links 178 to spread the inclined members of the molder-levers 173 and 174, and thus close the jaws. At the initial part of the closing of the jaws the finger 180, pressing against the spring 162, will so increase the pressure thereof on the forcer 170 that this will move the form along its slotted way until contact of the crimped counter-blank is effected with the jaws, this being accomplished before the jaws begin to exert a very material pressure on the blank and before the rounded end of the fitting 184 seats itself in the curved step 158. When this point is reached, the pressure on the stud 179 has caused the toggle-links to so spread the molder-levers that the jaws thereof are tightly compressed on the blank to mold the same to the form. Up to this time the strut 180, bearing against the forward end of the slide 156, has prevented the movement of the same; but as the forward end of the slide 157 meets the depending portion of the lifter-pawl 164 this pawl will be swung upward on its pivot, its upper portion engaging and lifting the free end of the strut 181 until it is above the top of the slide 156, and thus permiting the movement of this slide, the last squeeze on the counter by the jaws being made during the lifting of the strut. After the strut has been lifted above the slide 156 the two slides are free to be moved by the rack and gear to carry the jaws, the form, and the counter-blank under the ironer-plate 182, which turns down the crimped edge of the blank onto the surface of the last, smoothing the same by the frictional contact. At this time the form 202 has been supplied with a crimped counter-blank, and as the rack-lever 194 is drawn downward by the cam 196 the direction of rotation of the shaft 192 is reversed, causing the rearward reciprocation of the rack 185 and its mechanism and the forward reciprocation of the rack 206 and its mechanism. The counter-blank on the form 202 will thus be molded and its crimped edge ironed down, while the form 169 and its mechanism will be brought to positions to release the molded counter and to discharge the same. On the first movement of the rack 185 its tendency is to draw the slide 157 backward without effecting the corresponding movement of the slide 156. This is prevented by the latch 165, which at the forward movement of the slide 156 rides up onto the lower guide of the plate 152 and engages the rear end of the slide 157, so that on the reverse motion of the rack the slide 157 bears against this latch and draws the slide 156 thereby backward until the end of the guide on the plate 152 is reached and the latch falls from its engagement with the slide 157, permitting the independent movement of this slide to the position shown in Fig. 1. During the rearward movement of the slides 156 and 157 the jaws 175 and 176, with the form 169 and now finished counter 24, will pass from beneath the ironer-plate. The strut 181 will drop into place, bearing against the end of the slide 156. When the latch 165 disengages the slide 157, this slide will move rearwardly independently of the slide 156, carrying its stud 179 along through the slot 159 and drawing the toggle-links 178 178 and the inclined portions of the molder-levers inward, thus causing the opening of the jaws and the release of the form 169 and its counter. The spring 171 will now retract the form to its normal position, where an ejecting device is brought into action to eject the counter.

The ejector or kicker-off herein shown is carried by the brackets 211 211, secured to the plate 152 to clear the slide 156. In these brackets is journaled the shaft 212, having the tapering ejector-finger 214. To the shaft 212 and to the collar 215 is secured the enlarged tubular chamber 216, having a segmental slot 217 in its lower portion. Within this chamber is loosely mounted the sleeve 218, having the depending ear 219, which works through the segmental slot, while on the shaft 212 is the coiled spring 220, which, being fast to the nearest bracket 211 and to the collar 215, exerts a rotating pressure on the collar and its shaft to swing the ejector-finger 214 outward from the machine. On the rack 185 is the block 221, which moves with the rack in the path of the ear 219. As the rack 185 moves forward the block 221 is free to pass under the ear 219, this ear swinging on its sleeve; but when the rearward movement of the rack 185 begins the ear rides up onto the surface of the block, causing the rotation of the tube 213 against the action of its spring and bringing the ejector-finger 214 down onto the surface of the form 169 in position to engage the turned-over edge of the counter as the form is retracted. At this engagement the block 221 passes from beneath the ear 219, and the spring 220 acts to rotate the tube 213 and to swing the ejector-finger and the counter away from the form.

Having thus described my invention, I claim as new and desire to secure by Letters Patent—

1. A counter-machine comprising a frame, a female die fixed thereon, means fixed to said frame above the female die for receiving the died-out blank and a male die working in said female die.

2. A counter-machine comprising a frame, a female die fixed thereon, an inverted receiver for the died-out blank fixed above the female die and having an open end, a male die reciprocal in said frame and adapted to support the blank in the receiver, means for operating the male die, and means whereby the male die is yieldingly supported at the uppermost part of its stroke.

3. A counter-machine comprising side-fed dying-out mechanism provided with a fixed delivery-guide and gage-receptacle having an end-delivery opening in which the died-out blank is adapted to be yieldingly supported by the die.

4. A counter-machine comprising a frame, a series of pressure-rollers yieldingly supported therein, a female die mounted on said frame, a receiver having an open channel at one end secured above the female die, and a male die reciprocal in said frame.

5. A counter-machine comprising dying-out mechanism, a receiver for the died-out blank, and a work holder and feeder adapted to be engaged with a portion of the died-out blank to draw the same from the receiver.

6. A counter-machine comprising dying-out mechanism, having a female die, a male die movable therethrough, a receiver located above the female die, having a cavity corresponding in shape to the opening of the female die and having a delivery-channel extending into said cavity, and a work-holder and feed adapted to receive the died-out blank and draw the same from the delivery-channel.

7. A counter-machine comprising dying-out mechanism, a fixed receiver adapted to receive a died-out blank at each cycle of the dying-out mechanism, and movable means for withdrawing said blank from the receiver before the commencement of another cycle.

8. A counter-machine comprising dying-out mechanism including a female die, a male die working through the female die, a receiver shaped to receive the died-out blank from said female die, and having a delivery independent of its entrance, and means for removing the died-out blank from the receiver before the return stroke of the male die.

9. A counter-machine including a female die and a male die, a work-holder mounted to move at one side of the female die, and means for positioning the died-out blank in relation to the work-holder.

10. A counter-machine comprising a work-holder the area of which is divided into a series of vacuum-holding means, and mechanism whereby the counter-blank is automatically applied progressively over a series of said means.

11. A counter-machine comprising a work-holder having a series of open compartments each connected with a vacuum chamber or channel.

12. A counter mechanism comprising a work-holder having a series of open compartments, each furnished with a valve-controlled connection with a vacuum chamber or channel, and means for operating said valves in succession.

13. A counter-machine comprising a work-holder having a circumferential wall, supporting portions included within the wall and having surfaces in the general plane of the wall, and means for creating a vacuum at points within the wall.

14. A counter-machine comprising a work-holder having depressions, each having a valve-controlled inlet to a vacuum chamber or channel, and means for operating said valves in succession during the application of the counter-blank to the wall.

15. A work-holder consisting of a body to which the article may be applied, having a series of depressions, a valve-controlled inlet in each depression, actuating means for the valves extending outside the plane of the body, and means for applying the article against said actuating means in succession.

16. A counter-machine comprising a work-holder mounted on a rotatable base and having a series of valve-controlled inlets connected with a vacuum chamber or channel, a receiver for the counter-blank having an opening through which the work-holder and the counter-blank may be brought into contact, and means for actuating the valves in succession.

17. A counter-machine comprising a work-holder having depressions, each of which has an inlet, valves in the inlets, the valve-stems of which extend beyond the holding-surface, and a dying-out mechanism having means for pressing the counter-blank against the valve-stems and onto the holding-surface.

18. A vacuum work-holder including means controlled by the application of portions of the article for opening inlets to the vacuum chamber, or channel.

19. A counter-machine comprising a rotatable cylinder having a series of work-holders on its periphery, surface-cams at the side of and overlapping the ends of the work-holders, and a continuous cam-groove, a traversable skiving-cutter support having means for engaging said cam-groove, a skiving-cutter the frame of which is pivoted in said support, and means on said frame controlled by the cylinder-surface cams for swinging the frame.

20. A counter-machine comprising a rotatable skiving-cutter mounted for lateral and swinging movements, and means for controlling the movements of the same.

21. A counter-machine comprising a movable work holder and feed adapted to present a counter-blank to the skiving means, a bevel-cutter rotatably mounted in a fixed position at one side of the work-holder, a cutter with parallel cutting-surfaces rotatably mounted in a frame, a traversable carriage in which said frame is pivoted, and means for traversing the carriage and swinging said frame on its pivots.

22. A counter-machine comprising a rotatable cylinder having a series of vacuum work-holders, and means for breaking the vacuum to release the work.

23. A counter-machine comprising a rotatable cylinder having a series of vacuum work-holders, means for breaking the vacuum and a curved guard under which the work-holders enter before the vacuum is broken.

24. A counter-machine comprising means for holding and feeding counter-blanks, skiving means, crimping mechanisms and a feeding connection between the work-holder and the crimping mechanism.

25. A counter mechanism comprising a vacuum work-holder, means for breaking the vacuum, crimping mechanism, and a feed-conduit for the crimping mechanism into which the skived counter-blank passes when released from the work-holder.

26. A counter-machine comprising in organization, a dying-out machine, skiving means, crimping means, and mechanism whereby the died-out counter-blank is taken from the dying-out machine carried through the skiving means and fed to the crimping means.

27. A machine for transforming blanks into molded counters comprising skiving means and molding mechanism, and a crimping mechanism located intermediate the skiving means and the molding mechanism.

28. A counter-machine comprising crimping mechanism, a feed-conduit therefor, a delivery-conduit embracing a portion of one of the crimping-rolls, and a receiver intersecting the feed-conduit.

29. A counter-machine comprising crimping mechanism, a feed-conduit therefor, a delivery-conduit, a laterally-disposed receiver with which the delivery-conduit connects, and means for moving the crimped blanks in the receiver.

30. A counter-machine comprising crimping mechanism, a delivery-conduit, a lateral receiver with which the conduit connects, followers in said receiver, and means for operating the followers.

31. A counter-machine comprising a skiving mechanism, a crimping mechanism, means for feeding the counter-blank through the skiver to the crimper, duplex molding mechanism, and means for feeding the crimped counter-blanks, thereto from the crimper.

32. A counter-machine comprising a crimper mechanism, a lateral receiver for the crimped counters, a molder mechanism at each end of the receiver, and means for feeding to said machines alternately.

33. A counter-machine comprising a plurality of molding mechanisms means for alternately operating the same crimping mechanism located between the molding mechanisms and means for feeding crimped counter-blanks from the crimping-machine to the molding mechanisms.

34. A counter-machine comprising duplex counter-molders, a receiver and a feed mechanism therebetween adapted to feed crimped counter-blanks thereto in a curved condition, and means working in the receiver for feeding the blanks.

35. A counter-machine comprising a frame having an opening therein, a feed-channel curved in cross-section secured in the opening, a pair of plates mounted on said frame for reciprocation and having curved slots adapted at times to register with the feed-channel, a form carried by one of said plates, molding-jaws, and means controlled by the reciprocation of the other of said plates for opening and closing the jaws.

36. A counter-machine comprising a counter-molder consisting of a pair of plates mounted to reciprocate and having registering feed-slots, a form carried by one of said plates, molding means controlled by the other of said plates, and an ironer or edge-turner.

37. In a counter-machine, a counter-molder comprising guides a plate mounted to slide in said guides, a form mounted for independent movement on said plate, molding-jaws operatively mounted on said plate, said plate having a feed-slot between the form and the jaws, an ironer fixed in relation to said plate, and means for operating the jaws.

38. In a counter-machine, the molder mechanism comprising the sliding plates having the registering slots, the form mounted to slide on the first plate, the molder-levers pivoted on said plate and having the jaws, toggles to operate said levers connected with a stud on the second plate, releasable means for locking the plates together, and means for reciprocating the plates.

39. The work-holder cylinder and its work-holders, the valves therein, and the plate 70 having the curving channel 71 and the perforation 74.

40. A counter-machine comprising a work holder and feeder, the conduit 124 in association therewith, the receiver 125 intersecting the conduit, crimping mechanism with which said conduit connects, and means for feeding the crimped counter-blank from the crimper to said receiver.

41. A counter-molder comprising the plate 156 mounted in guides and having the slot 159, releasable means for locking said plate against independent movement, a molder mechanism carried by said plate, the plate 157 mounted to slide on the plate 156, means carried by the plate 157 and extending through the slot 159 for actuating the molder mechanism, and means for locking the plates together.

42. In a counter-machine, a pair of pivoted molder-jaws, means for operating the same, a form mounted to be moved between said jaws, and means actuated by one of said jaws for moving the form.

43. In a counter-machine, a stationary ironer, a plate movable in relation thereto, means for moving the plate, molding-jaws mounted on the plate, means for operating the jaws, a form reciprocal on the plate, and mechanism actuated through connection with one of said jaws for reciprocating the form.

44. In a counter-machine, a form mounted to reciprocate, molding means, means for moving the form between the molding means, and feeding mechanism adapted to feed a counter-blank to the form when said form is separated from the molding means.

45. In a counter-machine, a stationary ironer, molding means movable thereunder, a form mounted to reciprocate, feeding mechanism whereby a blank may be fed to the form means for moving the form between the molding means, and separate means for moving the molders and form beneath the ironer.

46. In a counter-machine duplex counter-molders, driving mechanism therefor, a feed-conduit fixed between the molders, means for feeding blanks into the conduit and means for moving the blanks along the conduit to each of the molders in succession.

47. In a counter-machine a feed-conduit, a molder located at each end thereof, feeding means movable in said conduit from end to end, and mechanism for operating the feeding means.

48. In a counter-machine, a transverse feed-conduit, frames in which the ends thereof are mounted, a plate mounted on one of said frames and having a slot corresponding in shape and location to that of the conduit, and a molder mechanism mounted on said plate and comprising a movable form and molder-jaws.

49. The combination with the guide-plate 152 the plate 156 reciprocal in the guides of the plate 152 and having the slot 166, a pair of molder-jaws mounted on the plate 156, and a form mounted to reciprocate on the plate 156, of means for moving the form between the molder-jaws, and means for closing the jaws thereon.

50. The combination with the guide-plate 152 the ironer-frame 154 mounted thereon and having the ironer 182, the plate 156 mounted to reciprocate in the guides of the plate 152, and having the slot 166, the molder-levers pivotally mounted on the plate 156, and the form mounted to reciprocate on said plate 156, of the plate 157 mounted to slide in guides of the plate 156, connections between the plate 157 and the molder-levers for operating the levers, means for moving the form between the jaws of the levers, and means for reciprocating the plate 157.

In testimony whereof we affix our signatures in presence of two witnesses.

RALPH P. STEVENS.
ALBERT L. WARE.

Witnesses:
W. STANLEY CAMPBELL,
H. J. MILLER.